United States Patent [19]
Williams

[11] Patent Number: 6,046,518
[45] Date of Patent: Apr. 4, 2000

[54] AXIAL GAP ELECTRICAL MACHINE

[76] Inventor: Malcolm R. Williams, 384 Calle Ariana, San Clemente, Calif. 92672

[21] Appl. No.: 09/235,051

[22] Filed: Jan. 21, 1999

[51] Int. Cl.[7] ........................................ H02K 1/04
[52] U.S. Cl. .......................... 310/43; 370/67 A; 370/114; 370/268
[58] Field of Search .................... 310/43, 67 R, 310/114, 156, 267, 268, 67 A

[56] References Cited

U.S. PATENT DOCUMENTS

| | | | |
|---|---|---|---|
| 1,747,560 | 2/1930 | Weathers | 310/67 |
| 3,566,165 | 2/1971 | Lohr | 310/67 |
| 4,211,963 | 7/1980 | Muller | 318/254 |
| 4,536,672 | 8/1985 | Kanayama et al. | 310/268 |
| 4,866,321 | 9/1989 | Blanchard et al. | 310/112 |
| 5,117,141 | 5/1992 | Hawsey et al. | 310/114 |
| 5,245,238 | 9/1993 | Lynch et al. | 310/116 |
| 5,334,898 | 8/1994 | Skybyk | 310/268 |
| 5,442,250 | 8/1995 | Stridsberg | 310/186 |
| 5,691,589 | 11/1997 | Keim et al. | 310/156 |
| 5,744,896 | 4/1998 | Kessinger, Jr. et al. | 310/268 |
| 5,767,600 | 6/1998 | Whiteley | 310/184 |
| 5,894,902 | 4/1999 | Cho | 180/65.5 |

*Primary Examiner*—Nestor Ramirez
*Assistant Examiner*—Joseph Waks
*Attorney, Agent, or Firm*—McAndrews, Held & Malloy, Ltd.

[57] ABSTRACT

An axial gap electrical machine employs a coil assembly embedded in epoxy and coated with a rubbery substance having different degrees of hardness.

Two magnet assemblies straddle a central coil assembly. The magnet assemblies each include a back iron casting located on the sides of the magnet assemblies away from the central coil assembly.

50 Claims, 10 Drawing Sheets

AXIAL GAP ELECTRICAL MACHINE

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

This invention relates to axial gap electrical machines, and more particularly relates to such machines employing permanent magnets.

Axial gap electrical machines have been proposed in the past. One example is found in U.S. Pat. No. 5,619,087 (Sakai, issued Apr. 8, 1997). According to the FIG. 9 embodiment, central windings 35A are part of the stator which surround a metal rotor shaft (Col. 8, lines 55–58) and which are molded with epoxy resin (Col. 8, lines 2–3). Back yokes 36-1 and 36-2, which are part of the stator, are formed of strip silicon steel (Col. 8, lines 6–11) and are fixed between an outer ring 36b and an inner ring 36a (FIG. 12). The back yokes are displaced from permanent magnets 30a by an air gap 38-1 and additional coils 35-B.

Additional patents showing various forms of axial gap machines are described in U.S. Pat. No. 4,278,927 (Grohe, issued Jul. 14, 1981) and U.S. Pat. No. 5,245,238 (Lynch et al., issued Sep. 14, 1993).

The present invention has application as an electric wheel motor. Wheel motors are described in U.S. Pat. No. 5,450,915 (Li, issued Sep. 19, 1995), U.S. Pat. No. 5,633,544 (Toida et al., issued May 27, 1997), U.S. Pat. No. 4,330,045 (Myers, issued May 18, 1982), U.S. Pat. No. 4,109,741 (Gabriel, issued Aug. 29, 1978), U.S. Pat. No. 4,799,564 (Iijima et al., issued Jan. 24, 1989), U.S. Pat. No. 5,322,141 (Brunner et al., issued Jun. 21, 1994), U.S. Pat. No. 5,272,938 (Hsu et al., issued Dec. 28, 1993) and U.S. Pat. No. 5,163,528 (Kawamoto et al., issued Nov. 17, 1992).

Although the electric machines described in the foregoing patents are useful for some applications, experience has shown that an improved axial gap machine can be created by departing from the design techniques taught in such patents and following the principles taught and claimed in this application.

BRIEF SUMMARY OF THE INVENTION

This invention is useful as an axial gap electric machine. In such an environment, the preferred embodiment includes a coil assembly defining a first side and a second side. The coil assembly preferably is fabricated from sheet material and may comprise one or more coils. A first structure supports the one or more coils and has a predetermined first hardness. A second structure at least partially covers the first structure and has a predetermined second hardness different from the first hardness.

First and second magnet assemblies are located on opposite sides of the coil assembly and comprise a plurality of permanent magnets generating a plurality of magnetic fields passing through at least part of the coil assembly. Magnet assembly carriers support the first and second magnet assemblies and comprise magnet field or flux couplers preferably located on the outside of the first and second magnet assemblies away from the coil assembly.

A bearing assembly enables the first and second magnet assemblies to move with respect to the coil assembly around an axis of rotation.

According to another feature of the invention, coils for an electric machine are fabricated by cutting strips from conductive sheet material and insulating the strips. The insulated strips are formed into one or more coils which are supported with a first material having a first hardness. The first material is coated at least in part with a second material having a second hardness.

By using the foregoing techniques, an electric machine can be fabricated with improved efficiency and results in an electric machine having improved operating characteristics.

DETAILED DESCRIPTION OF THE PREFERRED EMBODIMENTS

Referring to the drawings, an axial gap machine 1 made in accordance with the preferred form of the invention basically comprises a rotor 10, a stator 400 and a bearing assembly 480. Rotor 10 rotates around an axis of rotation 12.

Although the invention can be used as a generator, as well as a motor, the embodiment described in this specification takes the form of a wheel motor employing a tire 20 mounted on a rim 22. The rotor further includes a magnet assembly 30 and a magnet assembly 230.

Figure 1:
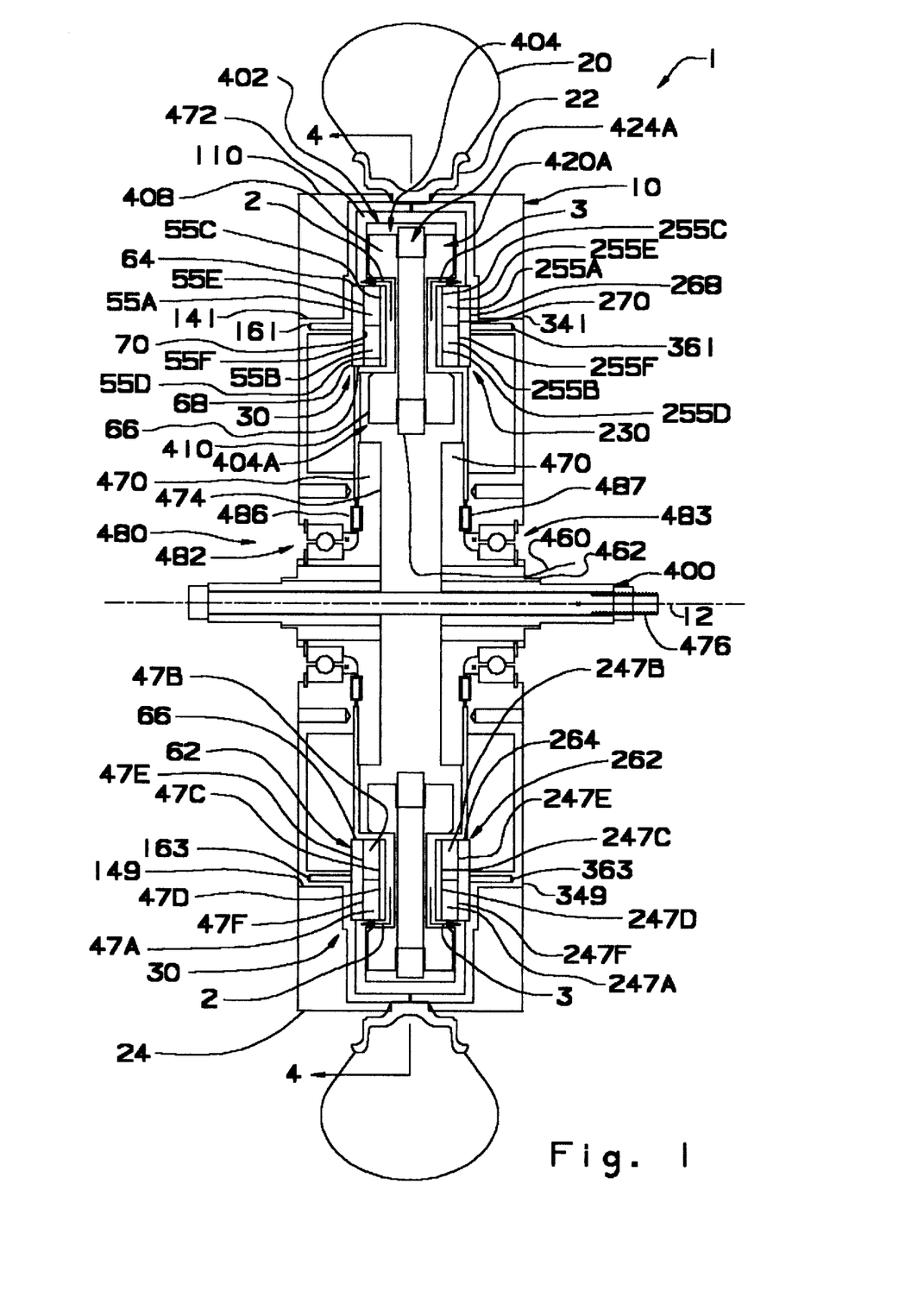
FIG. 1 is a cross sectional view bisecting a preferred form of electric machine made in accordance with the invention.
Figure 2:
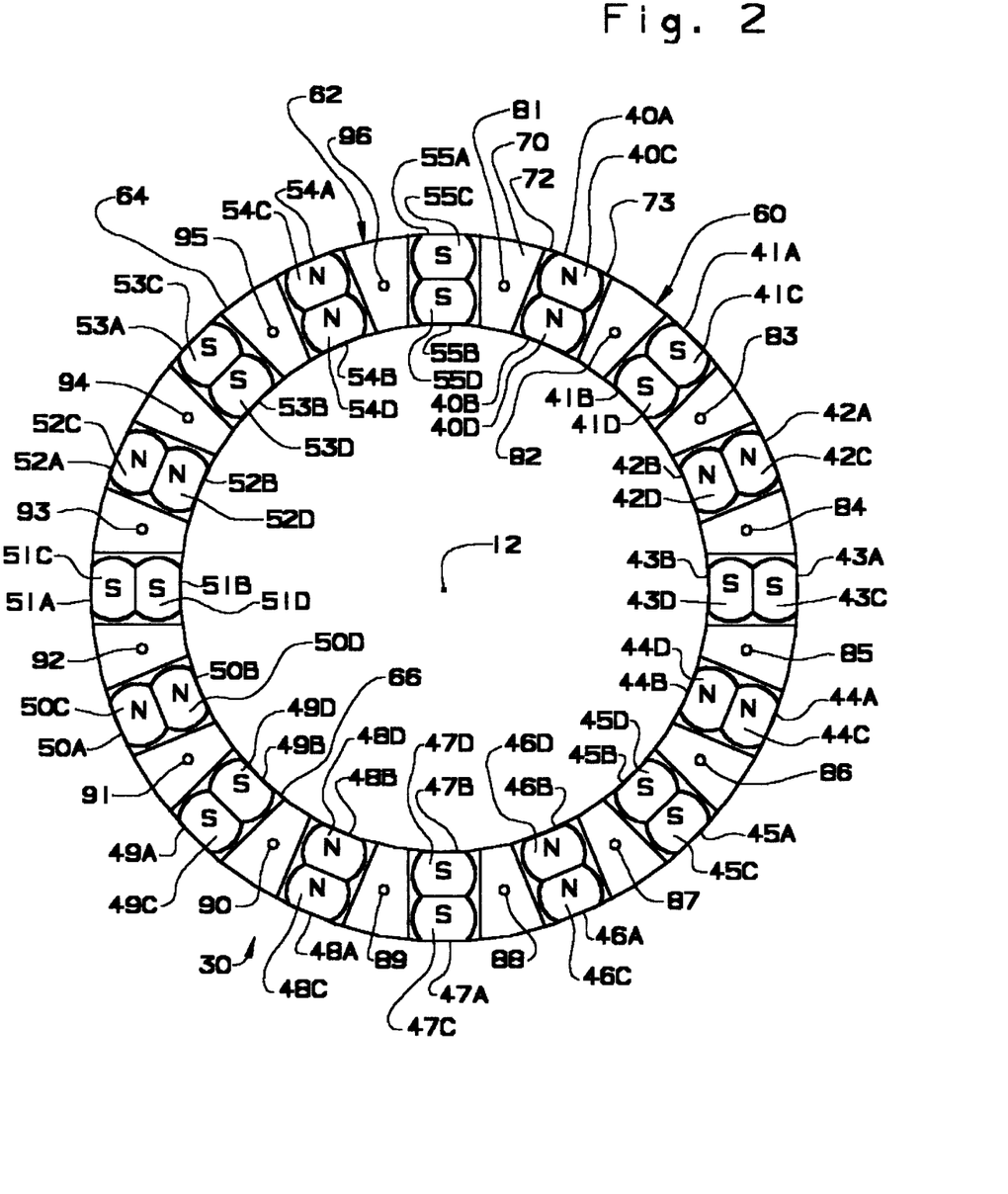
FIG. 2 is a cross sectional view taken along line 2—2 of FIG. 1 showing only the magnet assembly and carrier assembly of the preferred embodiment and rotated with respect to FIG. 1.

Referring to FIGS. 1 and 2, magnet assembly 30 includes 16 pairs of permanent rare earth magnets 40A–55A and 40B–55B which preferably are 37 million gauss oersted (MGO) ½ inch thick neodymium. The magnets have inside pole faces 40C–55C and 40D–55D, respectively. The magnet assembly forms 16 poles, although a different number of poles could be used. Each magnet also has an outside pole face on the side of the magnet opposite the inside pole face. Examples of the outside pole faces include 47E, 47F, 55E and 55F (FIG. 1). Each of the pole faces generates a magnetic pole which creates magnetic fields and flux fields. The S and N labels in FIGS. 2 and 3 indicate the polarity of the magnetic poles created by the magnets.

Figure 12:
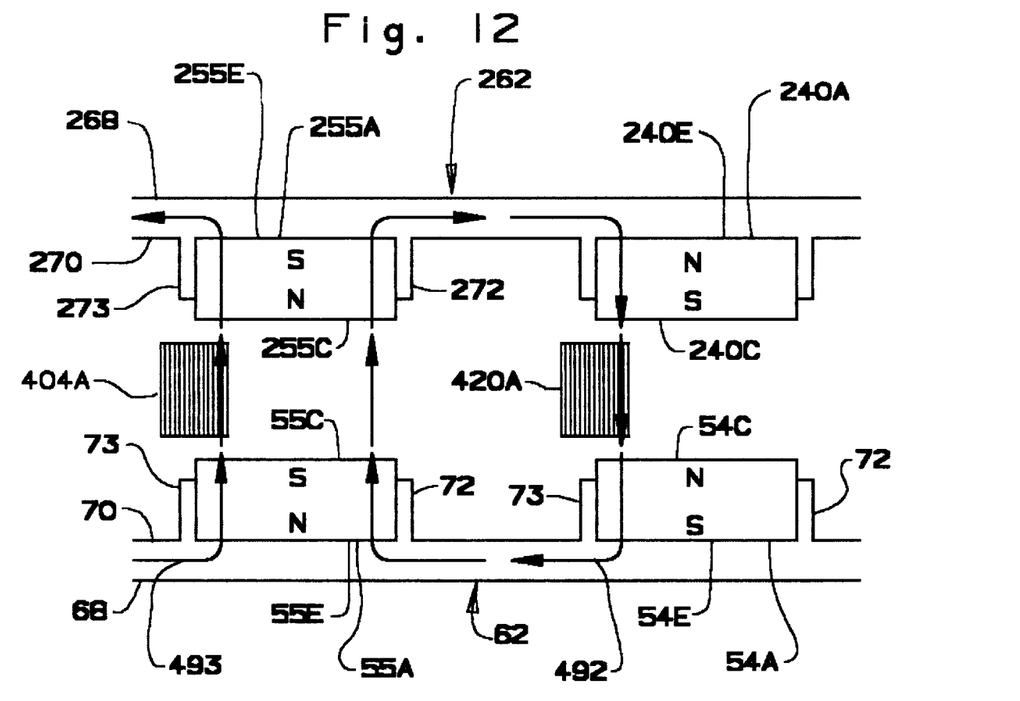
FIG. 12 is a fragmentary top plan view of a portion of the coil assembly, magnet assembly and carrier assembly shown in FIG. 1 illustrating magnetic fields or flux lines created by the magnet assembly.

Rotor 10 also includes carrier assemblies 60 and 260. Referring to FIGS. 1 and 2, carrier assembly 60 includes a ring-shaped back iron casting 62 fabricated from low carbon steel. Referring to FIGS. 1, 2 and 12, the casting has an outer circumference 64, an inner circumference 66, an outer face 68 and an inner face 70, and is about ¼ inch thick (i.e., the distance from face 68 to face 70 is about ¼ inch). The outer and inner pole faces are flat. Inner face 70 is contiguous with the outer pole faces of magnets 40A–55A and 40B–55B which are held to inner face 70 with bonding material. Therefore, there may be a slight space between inner face 70 and the outer pole faces. The pairs of magnets are further secured to casting 62 by pairs of ridges, such as 72–73. Alternatively, another shape can be chosen for the ridges, or bolting, clamping or wedging could be used to hold the magnets to casting 62. Securing the magnets to casting 62 strengthens magnet assembly 30.

Casting 62 is cast with mounting holes 81–96. The holes define a circle, and the magnet pairs are positioned equidistant along the circle.

Figure 4:
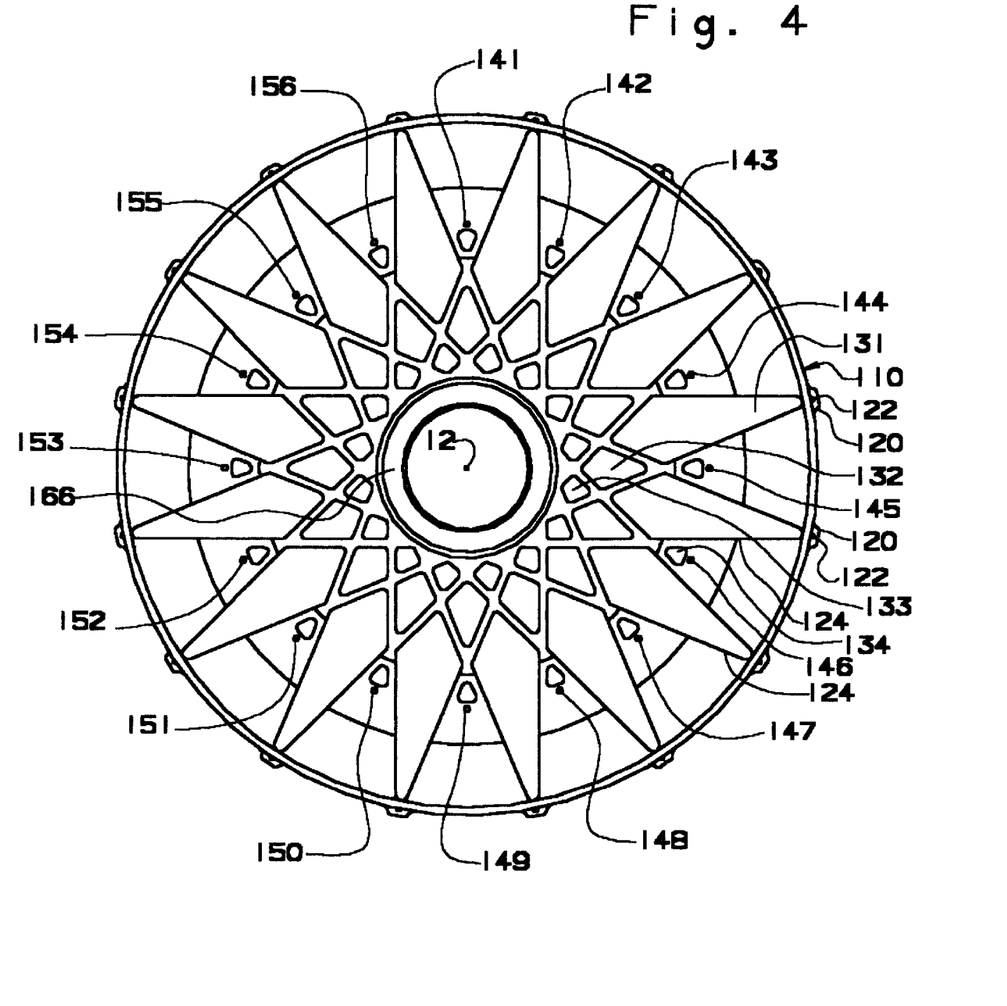
FIG. 4 is a reduced cross sectional view taken along line 4—4 of FIG. 1 showing only the rim cover of the preferred embodiment.
Figure 5:
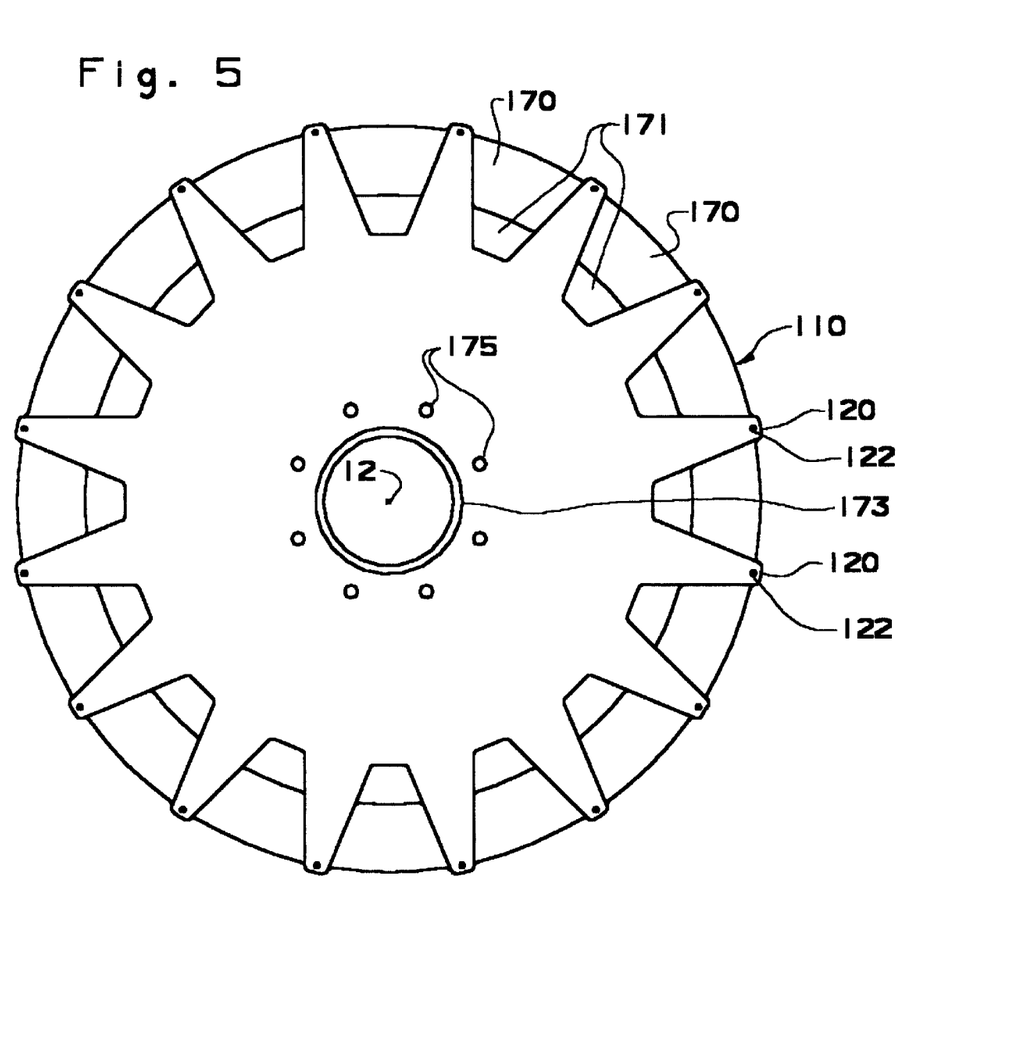
FIG. 5 is a reduced left side elevational view of the rim cover structure shown in FIG. 1.

Rotor 10 also includes a rim covers 110 and 310. Referring to FIGS. 1, 4 and 5, cover 110 includes rim tabs 120 which include holes 122 which are used to mount the cover to rim 22 by means of bolts. Radial spoke members 124 provide strength while minimizing the weight of the cover. Interior waffle recesses 131–134 reduce weight and circulate air for heat exchange during operation of the motor. Threaded mounting holes 141–156 are matched with holes 81–96 in order to mount casting 62 on cover 110 by means of bolts, such as bolts 161 and 163 (FIG. 1). A thrust bearing recess 166 is used to hold thrust bearings described later.

Referring to FIG. 5, exterior waffle recesses 170–171 reduce weight and circulate air for heat exchange during operation. A radial ball bearing recess 173 holds ball bearings described later. Threaded holes 175 are available to attach disc brakes, shaft yokes, gears, etc.

Figure 3:
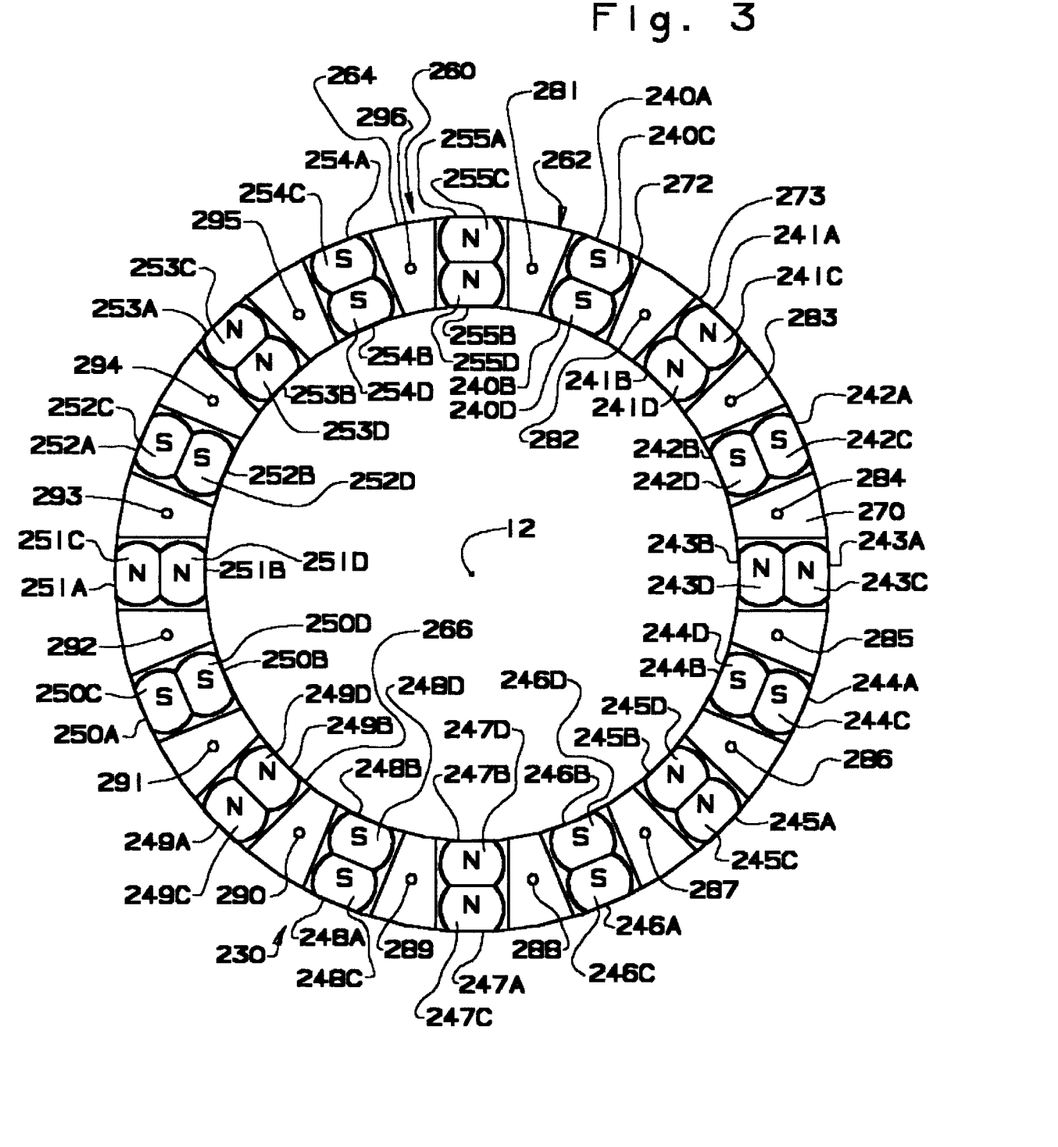
FIG. 3 is a cross sectional view taken along line 3—3 of FIG. 1 showing only the magnet assembly and carrier assembly of the preferred embodiment and rotated with respect to FIG. 1.

Referring to FIG. 3, magnet assembly 230 comprises pairs of permanent magnets 240A–255A and 240B–255B. The magnets have inside pole faces 240C–255C and 240D–255D, respectively. Each magnet also has an outside pole face on the sides of the magnet opposite the inside pole face. Examples of the outside pole faces include 247E, 247F, 255E and 255F (FIG. 1). Magnet assembly 230 is identical to magnet assembly 30, but is reversed from left to right.

Carrier assembly 260 is identical to carrier assembly 60, but is reversed from left to right. Referring to FIGS. 1, 3 and 12, carrier assembly 260 includes a back iron casting 262 having an outer circumference 264, an inner circumference 266, an outer face 268 and an inner face 270. As a result, castings 62 and 262 each are located on the side of the carrier assemblies away from a coil assembly 402. Pairs of ridges 272 and 273 hold the magnets in place on casting 262.

A rim cover 310 is identical to rim cover 110, except it is reversed from left to right. Holes 281–296 in casting 262 (FIG. 3) are used to mount casting 262 to rim cover 310 in the same manner casting 62 is mounted to rim cover 110. Rim 22 rigidly couples rim covers 110 and 310 so that they rotate together.

Referring to FIG. 1, stator 400 comprises a coil assembly 402 having a left and a right side. Assembly 402 includes eight sets of coils, such as coils 404A, 420A and 424A.

Figure 6:
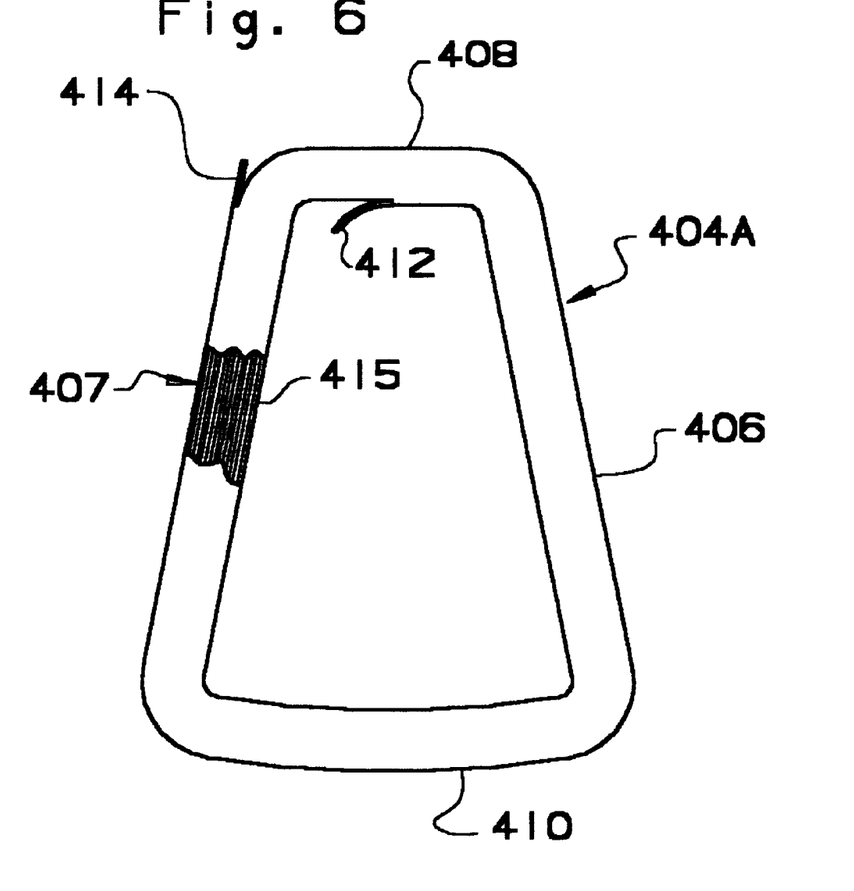
FIG. 6 is a left side elevational view of one of the coils shown in FIG. 1.

Referring to FIGS. 1 and 6, coil 404A defines vertical sections 406–407, a upper lateral section 408 laterally displaced from sections 406–407 and a lower lateral section 410 laterally displaced from sections 406–407. Coil 404A is fabricated from a single strip of half hard copper sheet beginning at an inner end 412 and ending at an outer end 414. The strip is wound helically or spirally into a trapezoidal shape as viewed in FIG. 6. As shown in detail portion 415, there are 14 turns in this coil.

Figure 7:
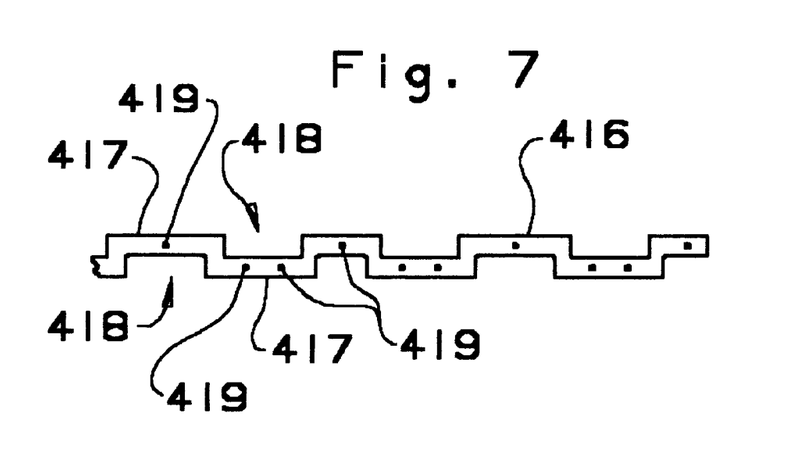
FIG. 7 is a top plan view of a preferred form of strip from which the coil shown in FIG. 6 may be fabricated.

Referring to FIG. 7, the strip 416 forming coil 404A is about one half inch wide and is cut into u-shaped sections 417 having openings 418 which face in opposite directions. Double adhesive backed electrical insulating tape (i.e., adhesive on both sides), such as mylar or kapton, is applied to the strip before cutting, so that the insulating tape and sheet are cut at the same time. Mounting holes 419 are stamped into the strip and insulating tape, and the back side is lapped or sanded to remove metal burrs. The strip then is placed in a tube and turned to make the coil helical or spiral as shown in FIG. 6. The coil then is coated with an insulating varnish, such as Dolph ER41. The spiral flat sheet coil construction greatly enhances coil strength, and provides stray flux force cancellation.

Referring to FIG. 1, coil assembly 402 also includes another coil 420A which is identical to coil 404A, but is reversed from left to right. Coil assembly 402 also includes another center coil 424A which is like coil 404A except that it has no laterally displaced sections. Coils 404A, 420A and 424A are nested as shown in FIG. 1 to form a coil set 431 (FIG. 8).

Hall effect devices 426–427 are located near coils 420H and 404A, respectively, to determine the magnet position for controller commutation purposes.

Figure 8:
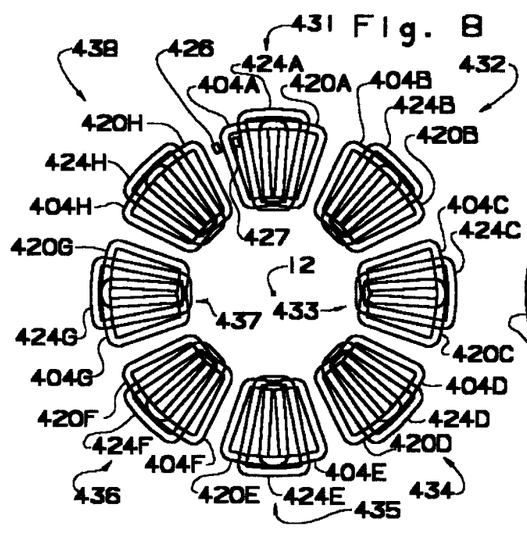
FIG. 8 is a schematic left side elevational view of the coil assembly shown in FIG. 1.
Figure 9:
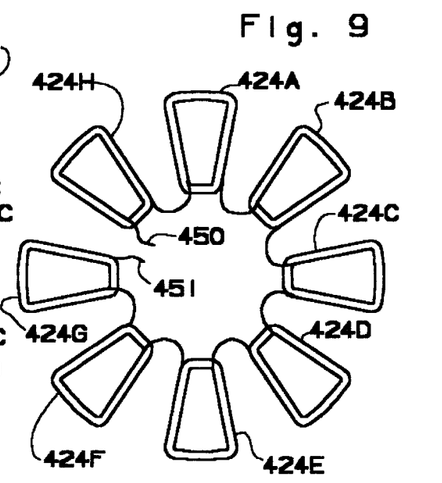
FIG. 9 is a schematic side elevational view of a first group of the coils shown in FIG. 8 illustrating the electrical series connections between the coils.
Figure 10:
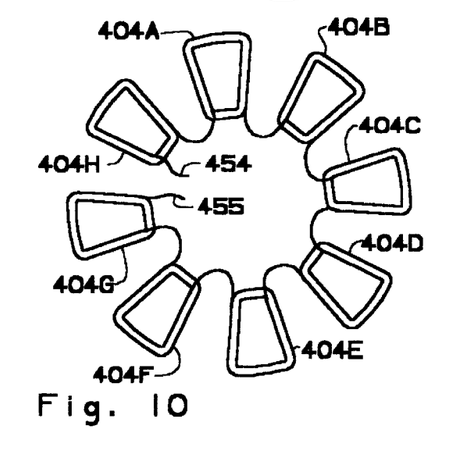
FIG. 10 is a schematic side elevational view of a second group of the coils shown in FIG. 8 illustrating the electrical series connections between the coils.
Figure 11:
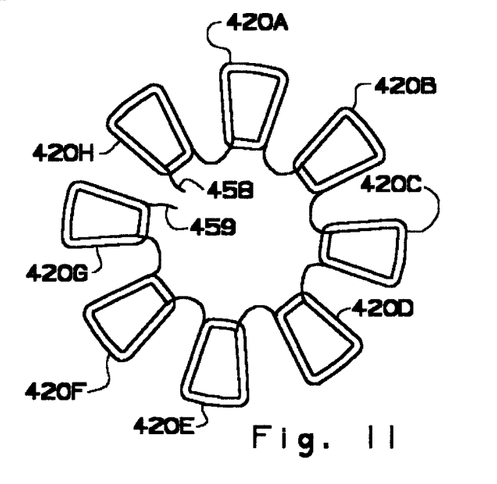
FIG. 11 is a schematic side elevational view of a third group of the coils shown in FIG. 8 illustrating the electrical series connections between the coils.

As shown in FIG. 8, additional coil sets 432–438 are arranged in a circle and are formed equidistant apart on the circle. The additional coil sets are identical to coil set 431. Coil sets 431–438 comprise coils 424A–424H (FIG. 9), 404A–404H (FIG. 10) and 420A–420H (FIG. 11). Coils 424A–424H are connected in series as shown in FIG. 9 and terminate in conductors 450–451 which may be connected to a controller. Coils 404A–404H are connected in series as shown in FIG. 10 and terminate in conductors 454–455 which may be connected to a controller. Coils 420A–420H are connected in series as shown in FIG. 11 and terminate in conductors 458–459 which may be connected to a controller.

Alternatively, the coils could be connected 4 in series, 2 in series or in parallel. More or fewer sets of coils could be used. The coil sets are not wound on any material containing any iron and are not wound on any laminations. Thus, the only core for coil sets 431–438 is epoxy. As a result, there are no eddy current losses due to eddy currents in a core on which the coil sets are wound.

Conductors 450–451, 454–455 and 458–459 are formed into a cable 460 (FIG. 1) which exits stator 400 through a hole 462.

Stator 400 also includes a stationary support hub 470 which supports the coil sets. Hub 470 is coated with a rubbery material 474 having a hardness of about 40 shore A, such as silicone rubber. The coil sets 431–438 then are mounted on the coated hub 470. Then coil sets 431–438 and hub 470, including the silicone rubber, are encapsulated in an epoxy resin 472 having a hardness of about 70 shore B. By using this hardness, the coil sets can move slightly under high force loads.

By using multiple hardness materials, the coil sets can withstand high frequency shock, and their resonance rejection capability is improved.

Stator 400 also includes a steel bolt 476 which strengthens hub 470. However, non-iron material other than steel can be used to minimize weight.

Referring to FIG. 1, bearing assembly 480 includes roller bearings 482–483 which enable rotor 10 to rotate around axis 12, and needle thrust bearings 486–487 which position magnet assembly 30 and carrier assembly 60 with respect to magnet assembly 230 and carrier assembly 260 as rotor 10 is revolving. Magnet assembly 30 is attracted to magnet assembly 230. Needle thrust bearings 486–487 prevent the magnet assemblies from changing lateral position with respect to each other and from adversely affecting performance while still allowing free rotation of rotor 10.

Referring to FIG. 12, during operation, exemplary primary power magnetic fields or flux lines 492–493 partially intercept the coil sets, including coils 404A and 420A. Since coil current is flowing either into or out of the paper as shown, and the fields or flux lines are also opposite (going up the page or down the page), by the cross-product laws of physics, the force is additive to the right or left along the page. This force causes rotor 10 to spin.

Figure 13:
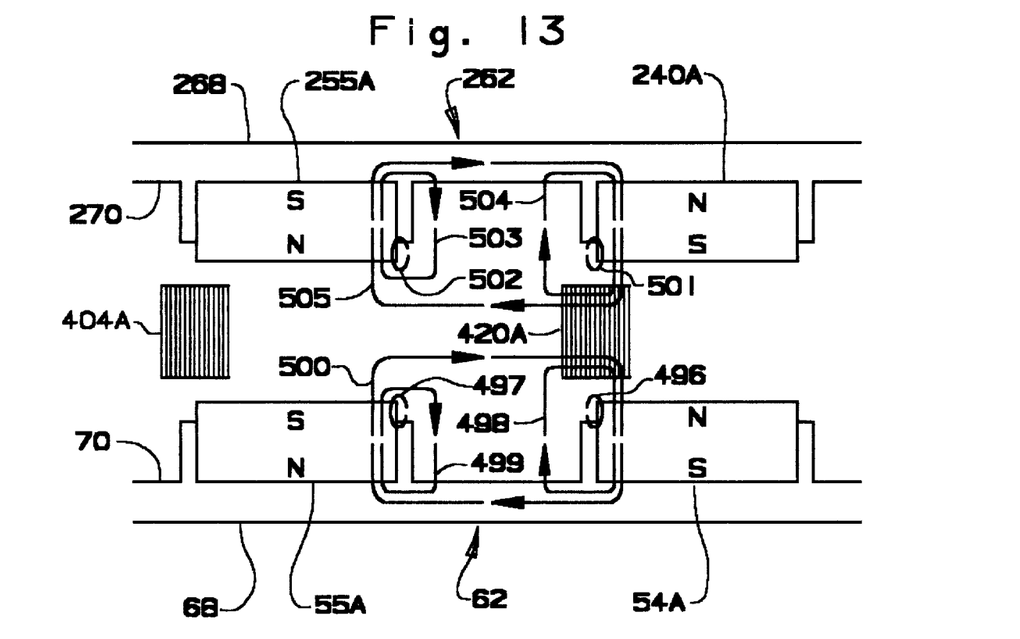
FIG. 13 is a view like FIG. 12 showing additional magnet fields or flux lines created by the magnet assembly.

FIG. 13 shows stray magnetic fields or flux lines 496–500 flowing clockwise and stray magnetic fields or flux lines 501–505 flowing counter clockwise. Since the coil current is flowing either into or out of the paper, as shown in FIG. 13, by the cross-product laws of physics, the forces are up or down the page, 90 degrees from the desirable direction of motion. In this design, the coil conductors are flat and carry current uniformly, with equal and opposite lines of stray field or flux. Therefore, the stray field or flux forces are balanced out and pull and push up and down the page. This stray flux force cancellation is important because there are no laminations to constrain the conductors against imbalance forces.

Figure 14:
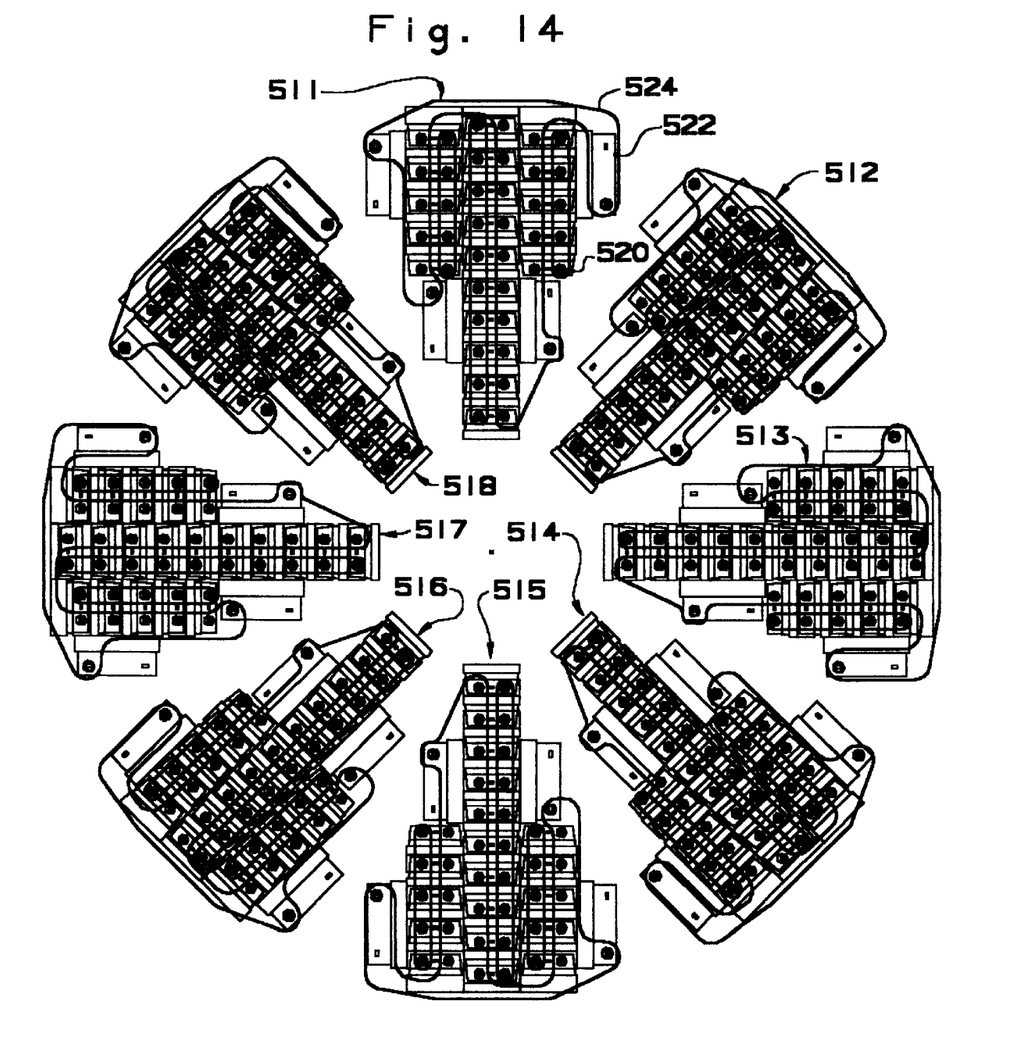
FIG. 14 is a top plan view of a preferred form of controller for the electric machine shown in FIG. 1.

Referring to FIG. 14, cable 460 is connected to 8 groups 511–518 of NMOS power devices. There are 20 devices in each group, such as NMOS power device 520. A conductor 524, picking up all the NMOS source leads, is used in each group.

Eight groups of four high speed power diodes, such as diode 522, are organized into four half-bridges to switch power in "Y" to the coil sets. The diodes are important because high anticipated regenerative braking current could occur.

Figure 15:
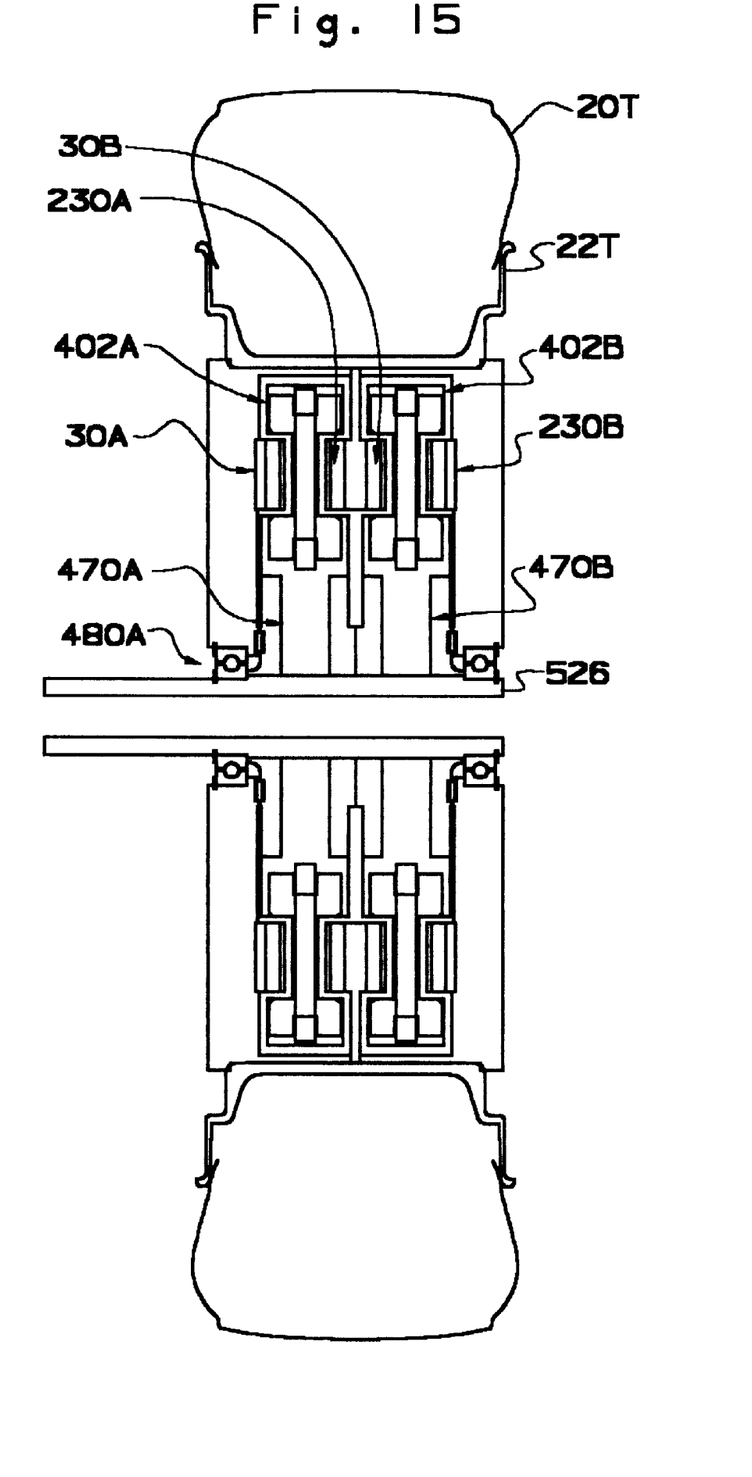
FIG. 15 is a fragmentary cross sectional view of another embodiment of the invention.

FIG. 15 illustrates an alternative embodiment of the invention. Each of the components bearing a letter suffix is identical to the like-numbered component described previously. A hollow shaft 526 is used for support and mounting, and as a duct for wires powering the stationary coil assemblies 402A and 402B. The FIG. 15 embodiment may be used to advantage as an automotive or truck motor, and uses a truck or auto tire 20T mounted on a truck or auto rim 22T.

The foregoing embodiments offer a number of advantages. The motor is a brushless direct drive axial-gap type, with permanent magnets in the outer rim-covers, which also can be attached to a tire. The high energy product permanent magnets enable large gaps without appreciable field weakening. These large gaps can be mostly filled with conductors to make high efficiency, low energy loss motors. No laminations are required. Therefore, no lamination losses occur. No lamination weight occurs.

The conductors are constructed to provide stray flux force canceling. The conductors are constructed such that they become structural members capable of withstanding high shock.

Since no laminations are required, the machine is lightweight. Only some back-iron is required for magnetic field focusing. The rim-cover holding the magnets is spoked and waffeled to reduce weight as well as to provide circulating air to cool the coils if required.

The 3-phase brushless motor controller power switching stage can be housed inside the hub to reduce EMI and feed conductor weight.

In a mobile application with the tire attached, overall weight is reduced. No drive train, differential, drive shaft, gear box, gears, or universal joints are required, saving weight compared to the traditional electric motor mobile application.

The foregoing embodiments may be altered and modified without departing from the true spirit and scope of the invention as defined by the accompanying claims.

I claim:

1. An axial gap electric machine comprising in combination:

a coil assembly defining a first side and a second side;

a first magnet assembly located adjacent the first side of the coil assembly and comprising a plurality of permanent first magnets generating a plurality of first magnetic fields passing through at least part of the coil assembly, said first magnet assembly defining a first group of magnetic poles adjacent the first side of the coil assembly and a second group of magnetic poles located axially farther away from the coil assembly than the first group of magnetic poles;

a first magnet assembly carrier mechanically coupled to said first magnet assembly and comprising a first magnetic field coupler located at least in part adjacent the second group of magnetic poles and coupling a magnetic field from a first magnetic pole in the second group of magnetic poles with a magnetic field from a second magnetic pole in the second group of magnetic poles;

a second magnet assembly located adjacent the second side of the coil assembly and comprising a plurality of permanent second magnets generating a plurality of second magnetic fields passing through at least part of the coil assembly, said second magnet assembly defining a third group of magnetic poles adjacent the second side of the coil assembly and a fourth group of magnetic poles located farther away from the coil assembly than the third group of magnetic poles;

a second magnet assembly carrier mechanically coupled to said second magnet assembly and comprising a second magnetic field coupler located at least in part adjacent the fourth group of magnetic poles and coupling a magnetic field from a first magnetic pole in the fourth group of magnetic poles with a magnetic field from a second magnetic pole in the fourth group of magnetic poles;

a mechanical coupler coupling the first magnet assembly and the second magnet assembly; and a bearing assembly enabling the coil assembly to move with respect to the first magnet assembly and the second magnet assembly around an axis of rotation.

2. The electric machine, as claimed in claim 1, wherein the machine comprises a motor.

3. The electric machine, as claimed in claim 1, wherein the coil assembly comprises a sheet material.

4. The electric machine, as claimed in claim 1, wherein the coil assembly comprises a first coil, second coil and third coil.

5. The electric machine, as claimed in claim 4, wherein the first coil, second coil and third coil each comprise a sheet material.

6. The electric machine, as claimed in claim 1, wherein the coil assembly comprises a non-iron core.

7. The electric machine, as claimed in claim 1, wherein the first magnets define a first circle and the first magnets are spaced equidistant around the first circle.

8. The electric machine, as claimed in claim 7, wherein the second magnets define a second circle and the second magnets are spaced equidistant around the second circle.

9. The electric machine, as claimed in claim 1, wherein the first magnet assembly carrier comprises a first casting comprising iron and the second magnet assembly carrier comprises a second casting comprising iron.

10. The electric machine, as claimed in claim 9, wherein the first casting is contiguous with at least some of the first magnets and the second casting is contiguous with at least some of the second magnets.

11. The electric machine, as claimed in claim 1, wherein the machine comprises a motor and wherein the mechanical coupler comprises a rim displaced radially outward from the coil assembly.

12. The electric machine, as claimed in claim 11, and further comprising a wheel mounted on the rim.

13. The electric machine, as claimed in claim 1, wherein the coil assembly comprises a stator, and wherein the first magnet assembly, second magnet assembly, first magnet assembly carrier and second magnet assembly carrier comprises a rotor.

14. The electric machine, as claimed in claim 13, wherein the bearing assembly comprises:

a first bearing enabling the rotor to rotate around the axis of rotation; and a second bearing positioning the first magnet assembly with respect to the second magnet assembly.

15. An axial gap electric machine comprising in combination:

a coil assembly defining a first side and a second side, said coil assembly being fabricated from a sheet material;

a first magnet assembly located adjacent the first side of the coil assembly and comprising a plurality of permanent first magnets generating a plurality of first magnetic fields passing through at least part of the coil assembly, said first magnet assembly defining a first group of magnetic poles adjacent the first side of the coil assembly and a second group of magnetic poles located axially farther away from the coil assembly than the first group of magnetic poles, the second group of magnetic poles being coupled magnetically with respect to each other and the first group of magnetic poles being uncoupled magnetically with respect to each other;

a first magnet assembly carrier fixed in position relative to said first magnetic assembly and coupling said second group of magnetic poles with respect to each other; and a bearing assembly enabling the coil assembly to move with respect to the first magnet assembly around an axis of rotation.

16. The electric machine, as claimed in claim 15, wherein the first magnet assembly carrier comprises a first magnetic field coupler located at least in part adjacent the second group of magnetic poles and coupling a magnetic field from a first magnetic pole in the second group of magnetic poles with a magnetic field from a second magnetic pole in the second group of magnetic poles.

17. The electric machine, as claimed in claim 16, and further comprising:

a second magnet assembly located adjacent the second side of the coil assembly and comprising a plurality of permanent second magnets generating a plurality of second magnetic fields passing through at least part of the coil assembly, said second magnet assembly defining a third group of magnetic poles adjacent the second side of the coil assembly and a fourth group of magnetic poles located farther away from the coil assembly than the third group of magnetic poles; and a second magnet assembly carrier comprising a second magnetic field coupler located at least in part adjacent the fourth group of magnetic poles and coupling a magnetic field from a first magnetic pole in the fourth group of magnetic poles with a magnetic field from a second magnetic pole in the fourth group of magnetic poles; and a mechanical coupler coupling the first magnet assembly and the second magnet assembly; and wherein the bearing assembly enables the first magnet assembly and second magnet assembly to move with respect to the coil assembly around the axis of rotation.

18. The electric machine, as claimed in claim 17, wherein the first magnets define a first circle and the first magnets are spaced equidistant around the first circle.

19. The electric machine, as claimed in claim 18, wherein the second magnets define a second circle and the second magnets are spaced equidistant around the second circle.

20. The electric machine, as claimed in claim 17, wherein the first magnet assembly carrier comprises a first casting comprising iron and the second magnet assembly carrier comprises a second casting comprising iron.

21. The electric machine, as claimed in claim 20, wherein the first casting is contiguous with at least some of the first magnets and the second casting is contiguous with at least some of the second magnets.

22. The electric machine, as claimed in claim 17, wherein the machine comprises a motor and wherein the mechanical coupler comprises a rim displaced radially outward from the coil assembly.

23. The electric machine, as claimed in claim 22, and further comprising a wheel mounted on the rim.

24. The electric machine, as claimed in claim 17, wherein the coil assembly comprises a stator, and wherein the first magnet assembly, second magnet assembly, first magnet assembly carrier and second magnet assembly carrier comprises a rotor.

25. The electric machine, as claimed in claim 24, wherein the bearing assembly comprises:

a first bearing enabling the rotor to rotate around the axis of rotation; and a second bearing positioning the first magnet assembly with respect to the second magnet assembly.

26. The electric machine, as claimed in claim 15, wherein the machine comprises a motor.

27. The electric machine, as claimed in claim 15, wherein the coil assembly comprises a first coil, a second coil and a third coil, each coil being helically wound.

28. The electric machine, as claimed in claim 27, wherein the first coil, second coil and third coil each comprise sheet material having a generally trapezoidal shape.

29. The electric machine, as claimed in claim 15, wherein the coil assembly comprises a non-iron core.

30. The electric machine, as claimed in claim 15, wherein the coil assembly is fabricated from a half hard conductive sheet material.

31. The electric machine, as claimed in claim 30, wherein said sheet material defines unshaped sections which open in opposite directions.

32. The electric machine, as claimed in claim 30, wherein at least some of the sheet material is separated by insulating tape.

33. An axial gap electric machine comprising in combination:
a coil assembly defining a first side and a second side and comprising one or more coils;
a first structure having a predetermined first hardness located adjacent the one or more coils;
a shock absorbing substance having a predetermined second hardness different from the first hardness located adjacent said coil assembly and enabling the one or more coils to move in response to a force;
a first magnet assembly located adjacent the first side of the coil assembly and comprising a plurality of permanent first magnets generating a plurality of first magnetic fields passing through at least part of the coil assembly, said first magnet assembly defining a first group of magnetic poles adjacent the first side of the coil assembly and a second group of magnetic poles located axially farther away from the coil assembly than the first group of magnetic poles;
a first magnet assembly carrier; and
a bearing assembly enabling the coil assembly to move with respect to the first magnet assembly around an axis of rotation.

34. The electric machine, as claimed in claim 33, and further comprising:
a second magnet assembly located adjacent the second side of the coil assembly and comprising a plurality of permanent second magnets generating a plurality of second magnetic fields passing through at least part of the coil assembly, said second magnet assembly defining a third group of magnetic poles adjacent the second side of the coil assembly and a fourth group of magnetic poles located axially farther away from the coil assembly than the third group of magnetic poles; and
a second magnet assembly carrier comprising a second magnetic field coupler located at least in part adjacent the fourth group of magnetic poles and coupling a magnetic field from a first magnetic pole in the fourth group of magnetic poles with a magnetic field from a second magnetic pole in the fourth group of magnetic poles; and
a mechanical coupler coupling the first magnet assembly and the second magnet assembly; and
wherein the bearing assembly enables the first magnet assembly and second magnet assembly to move with respect to the coil assembly around the axis of rotation.

35. The electric machine, as claimed in claim 34, wherein the first magnets define a first circle and the first magnets are spaced equidistant around the first circle.

36. The electric machine, as claimed in claim 35, wherein the second magnets define a second circle and the second magnets are spaced equidistant around the second circle.

37. The electric machine, as claimed in claim 34, wherein the first magnet assembly carrier comprises a first casting comprising iron and the second magnet assembly carrier comprises a second casting comprising iron.

38. The electric machine, as claimed in claim 37, wherein the first casting is contiguous with at least some of the first magnets and the second casting is contiguous with at least some of the second magnets.

39. The electric machine, as claimed in claim 34, wherein the machine comprises a motor and wherein the mechanical coupler comprises a rim displaced radially outward from the coil assembly.

40. The electric machine, as claimed in claim 39, and further comprising a wheel mounted on the rim.

41. The electric machine, as claimed in claim 34, wherein the coil assembly comprises a stator, and wherein the first magnet assembly, second magnet assembly, first magnet assembly carrier and second magnet assembly carrier comprises a rotor.

42. The electric machine, as claimed in claim 41, wherein the bearing assembly comprises:
a first bearing enabling the rotor to rotate around the axis of rotation; and
a second bearing positioning the first magnet assembly with respect to the second magnet assembly.

43. The electric machine, as claimed in claim 33, wherein substance comprises silicon rubber and wherein the first structure comprises epoxy.

44. The electric machine, as claimed in claim 33, wherein the coil assembly comprises a first coil, a second coil and a third coil.

45. The electric machine, as claimed in claim 44, wherein the first coil, second coil and third coil each comprise sheet material.

46. The electric machine, as claimed in claim 33, wherein the substance has more resilience than the first structure.

47. The electric machine, as claimed in claim 33, wherein the first structure is placed at least in part over the substance and in which the second hardness is less than the first hardness.

48. The electric machine, as claimed in claim 47, wherein the ratio of the second hardness to the first hardness is substantially 4 to 7 where the hardness is measured in Shore units.

49. The electric machine, as claimed in claim 47, wherein the second hardness is substantially 40 Shore and the first hardness is substantially 70 Shore.

50. The electric machine, as claimed in claim 33, wherein the coil assembly comprises a non-iron core.

* * * * *